US006845317B2

(12) United States Patent
Craine

(10) Patent No.: US 6,845,317 B2
(45) Date of Patent: Jan. 18, 2005

(54) NAVIGATIONAL-BASED SPEED LIMIT RECORDING AND WARNING SYSTEM

(76) Inventor: Dean A. Craine, 18514-134th Ave. SE., Renton, WA (US) 98058

(*) Notice: Subject to any disclaimer, the term of this patent is extended or adjusted under 35 U.S.C. 154(b) by 0 days.

(21) Appl. No.: 10/302,671

(22) Filed: Nov. 22, 2002

(65) Prior Publication Data
US 2004/0088105 A1 May 6, 2004

Related U.S. Application Data
(60) Provisional application No. 60/423,538, filed on Nov. 4, 2002.

(51) Int. Cl.[7] .............................................. B61L 27/00
(52) U.S. Cl. ........................... 701/200; 701/70; 701/93; 340/438; 340/905; 342/357.13; 342/20
(58) Field of Search ............................... 342/20, 357.13; 701/200, 208, 70, 119, 65, 93, 96, 207, 210, 209, 110; 180/170, 171; 340/905, 932, 936, 438, 938, 937, 990, 995; 123/351

(56) References Cited

U.S. PATENT DOCUMENTS

| | | | |
|---|---|---|---|
| 5,485,161 A | | 1/1996 | Vaughn .................... 342/357 |
| 5,819,198 A | | 10/1998 | Peretz ...................... 701/117 |
| 5,844,505 A | * | 12/1998 | Van Ryzin ................ 340/988 |
| 5,977,884 A | | 11/1999 | Ross ........................ 340/936 |
| 6,008,740 A | | 12/1999 | Hopkins ................... 340/905 |
| 6,163,277 A | * | 12/2000 | Gehlot ...................... 340/905 |
| 6,166,658 A | * | 12/2000 | Testa ........................ 340/905 |
| 6,213,401 B1 | * | 4/2001 | Brown ...................... 235/486 |
| 6,246,948 B1 | * | 6/2001 | Thakker ..................... 701/93 |
| 6,265,989 B1 | | 7/2001 | Taylor ...................... 340/901 |
| 6,353,796 B1 | * | 3/2002 | Schipper et al. ........... 701/207 |
| 6,356,812 B1 | * | 3/2002 | Cragun ........................ 701/1 |
| 6,462,675 B1 | | 10/2002 | Humphrey et al. ........ 340/905 |
| 6,473,000 B1 | * | 10/2002 | Secreet et al. ............ 340/936 |
| 6,515,596 B2 | * | 2/2003 | Awada ..................... 340/905 |
| 6,529,153 B1 | * | 3/2003 | Dijkstra ..................... 342/20 |
| 6,633,811 B1 | * | 10/2003 | Aumayer ................... 701/207 |
| 6,657,584 B2 | * | 12/2003 | Cavallaro et al. ...... 342/357.06 |
| 2002/0126023 A1 | * | 9/2002 | Awada ..................... 340/905 |
| 2002/0152026 A1 | * | 10/2002 | Evans ....................... 701/210 |
| 2003/0023353 A1 | * | 1/2003 | Badarneh ..................... 701/1 |
| 2003/0033082 A1 | * | 2/2003 | Yanagidaira et al. ...... 701/207 |
| 2003/0052797 A1 | * | 3/2003 | Rock et al. ............... 340/936 |
| 2003/0195701 A1 | * | 10/2003 | Ohler ....................... 701/209 |

\* cited by examiner

*Primary Examiner*—Thomas G. Black
*Assistant Examiner*—Tuan C To

(57) ABSTRACT

A motor-vehicle navigation-based speed limit recording and warning system designed to automatically inform drivers when they are exceeding the posted speed limit on a particular roadway. The system includes a navigational system that displays a plurality of roadways on a map and the motor vehicle's location thereon. The navigational system also includes a "mark" point feature or function that enables a driver to manually enter "mark" points and assign a speed limit to each "mark" point. The "mark" point feature or function may be directly coupled to the motor vehicle's speedometer so that the driver may simultaneously input both the motor vehicle's current speed and the "mark" point on the roadway.

17 Claims, 6 Drawing Sheets

```
┌─────────────────────────────────────────────┐
│ SELECTING A GPS-BASED NAVIGATIONAL          │
│ SYSTEM 11 LOCATED INSIDE A MOTOR            │
│ VEHICLE 10, SAID GPS-BASED NAVIGATIONAL     │
│ SYSTEM 11 INCLUDING A GPS RECEIVER 13, A    │
│ VISUAL DISPLAY 10, A MAP DATABASE 24, AND   │
│ MEANS FOR SELECTING A MARK POINT ON A       │
│ ROADWAY PRESENTED ON SAID VISUAL            │
│ DISPLAY 19, AND MEANS FOR INPUTTING         │
│ POSTED SPEED LIMITS INTO THE GPS-BASED      │
│ NAVIGATIONAL SYSTEM 11;                     │
└─────────────────────────────────────────────┘
                      ↓
┌─────────────────────────────────────────────┐
│ ACTIVATING SAID GPS-BASED NAVIGATIONAL      │
│ SYSTEM 11;                                  │
└─────────────────────────────────────────────┘
                      ↓
┌─────────────────────────────────────────────┐
│ SELECTING A 'MARK' LOCATION ON A            │
│ ROADWAY ON SAID MAP DATABASE 24;            │
└─────────────────────────────────────────────┘
                      ↓
┌─────────────────────────────────────────────┐
│ INPUTTING A SPEED LIMIT 77 FOR THE          │
│ SELECTED ROADWAY AT SAID 'MARK'             │
│ LOCATION ON SAID MAP DATABASE 24,           │
│ MONITORING THE TRAFFIC IN THE REGION 82     │
│ FOR TRAFFIC CONGESTION EVENTS.              │
└─────────────────────────────────────────────┘
```

*FIG. 5*

SELECTING A GPS-BASED NAVIGATIONAL SYSTEM 11 LOCATED INSIDE A MOTOR VEHICLE 10, SAID GPS-BASED NAVIGATIONAL SYSTEM 11 INCLUDING A GPS RECEIVER 13, A VISUAL DISPLAY 10, A MAP DATABASE 24, AND MEANS FOR SELECTING A MARK POINT ON A ROADWAY PRESENTED ON SAID VISUAL DISPLAY 19, AND MEANS FOR INPUTTING POSTED SPEED LIMITS INTO THE GPS-BASED NAVIGATIONAL SYSTEM 11;

↓

ACTIVATING SAID GPS-BASED NAVIGATIONAL SYSTEM 11;

↓

SELECTING A 'MARK' LOCATION ON A ROADWAY ON SAID MAP DATABASE 24 WHERE THE SPEED LIMIT 77 IS POSTED

↓

INPUTTING A SPEED LIMIT NUMBER FOR EACH 'MARK' LOCATION; AND,

↓

DRIVING ON SAID ROADWAY TO RECEIVE THE RECORDED SPEED LIMIT INFORMATION 89 ASSOCIATED WITH EACH 'MARK' LOCATION

*FIG. 6*

NAVIGATIONAL-BASED SPEED LIMIT RECORDING AND WARNING SYSTEM

This utility patent application claims the benefit of provisional patent application (Ser. No. 60/423,538) filed on Nov. 4, 2002.

BACKGROUND OF THE INVENTION

1. Field of the Invention

This invention pertains to systems and methods for recording and monitoring the posted speed limits on roadways in a selected region.

2. Description of the Related Art

Generally, drivers are more likely to exceed the posted speed limits on county or city regulated roads and highways rather than state regulated roads and highways. One reason for this is that fewer state traffic enforcement personnel are available to monitor interstate highways than county or city traffic enforcement personnel.

Many county or city roads are two or four lane roadways that wind through different junctions, neighborhoods or small cities. Many of these roads are located by schools or businesses that require reduced posted speed limits. As a result, the posted speeds limits on county and state roads vary greatly and change every few miles. As a result, drivers must pay close attention to the vehicle speeds to keep from speeding. Unfortunately, many drivers become distracted or don't see a posted speed limit sign, which results in speeding infractions.

Navigational systems for motor vehicles are relatively common. Most navigational systems today include receivers that receive signals from global positioning satellites and an on-board optical disc player that plays one or more optical discs with a map database recorded thereon to provide current location and route guidance information to drivers. Most navigational systems enable drivers to selectively designate and record "mark" points on the display map. The "mark" points are stored in the permanent memory of the GPS receiver for later use.

What is needed is a system and method for easily recording and monitoring speed limits on roadways in a region that later may be used to automatically inform the driver of the posted speed limits and then automatically warn the driver when the posted speed limit of a roadway is exceeded.

SUMMARY OF THE INVENTION

A navigational-based speed limit recording and warning system designed to allow a driver to selectively input and record the posted speed limits on roadways into their motor vehicle navigational system. Later, the system may be used to automatically inform the driver of the posted speed limit and possibly warn the driver when he or she exceeds the recorded posted speed limit. The system includes a navigational system located inside the motor vehicle capable of tracking and displaying the motor vehicle location on a map displayed to the driver. In one embodiment, the navigational system is an existing GPS-based navigation system including a visual monitor, a map database that contains roadway information for a desired region, and a "mark" location feature that enables the driver to selectively "mark" or designate locations on the roadways presented on the monitor. During use, a map is displayed on the monitor showing the location of the motor vehicles the roadways and the "mark" locations.

Coupled to the navigation system is a means for associating a speed limit with a roadway or "mark" location. In one embodiment, the means for associating the speed limit is one or more numeric buttons connected to or displayed on the monitor, that the driver uses to manually input and associate a speed limit with a designated "mark" location. In another embodiment, the means for associating the speed limit is a link between the motor vehicle's speedometer or speed recording system that the driver selectively activates to transmit the motor vehicle's current speed to the navigation system which automatically associates it with the designated "mark" location. In still another embodiment, the means for associating the speed limit to a "mark" location is a combination button located in a convenient location for the driver, such as the steering wheel, that is used by the driver to simultaneously "mark" a designated location and automatically associate the motor vehicle's current speed thereto.

Later when traveling on the roadway, the navigation system monitors the motor vehicle's current location and displays the posted speed limit associated with the most recently passed "mark" location. The system may include a dashboard or speedometer indicator means that informs the driver when the motor vehicle has exceeded the posted speed limit on the roadway.

BRIEF DESCRIPTION OF THE DRAWINGS

FIG. 5 is a block diagram presenting the steps of the method of recording the speed limits.

FIG. 6 is a block diagram presenting the steps of a method of displaying the speed limits of roadways to a driver.

DESCRIPTION OF THE PREFERRED EMBODIMENT(S)

Figure 1:
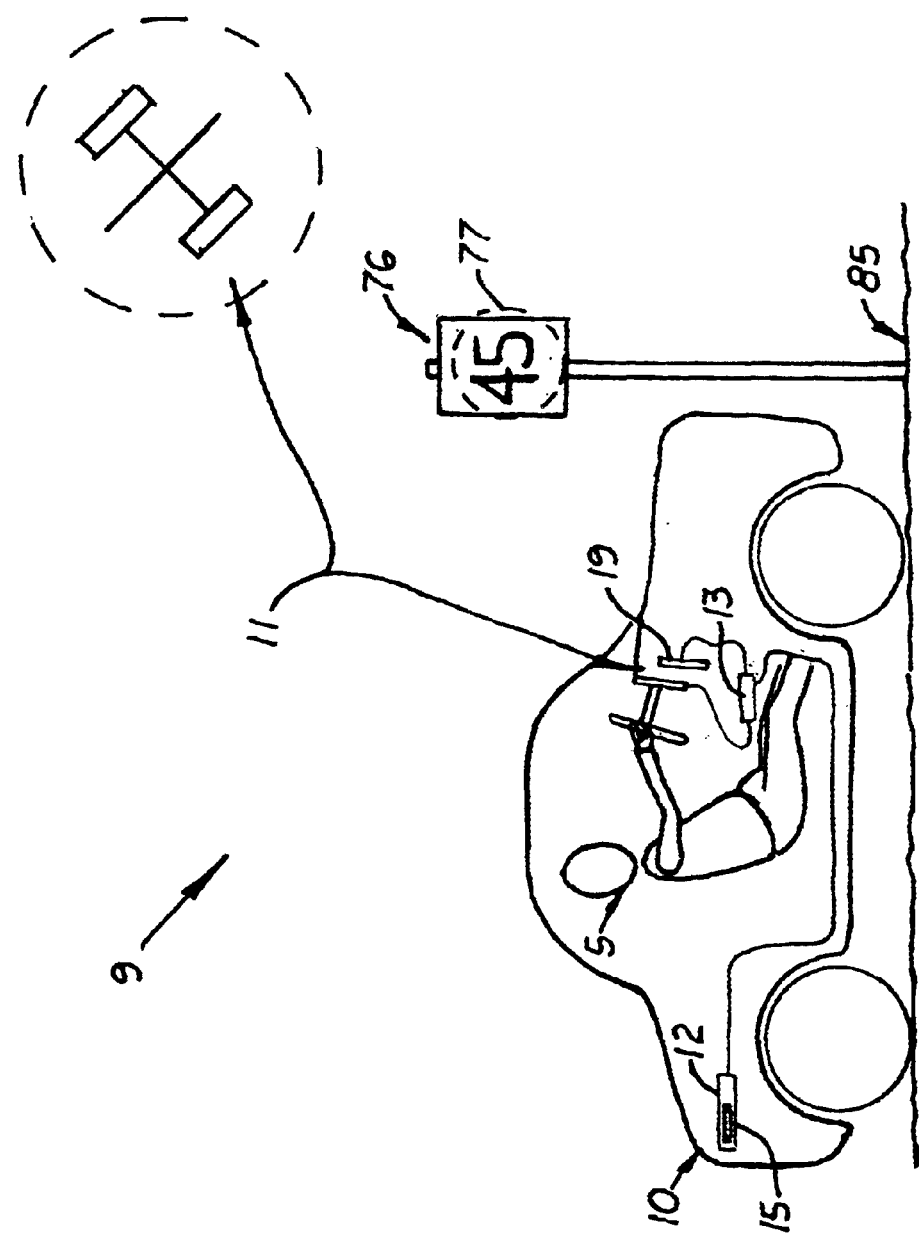
FIG. 1 is an illustration of a motor vehicle with a navigational system and the manually inputted speed limit recording and monitoring system located therein.

Referring to the accompanying FIGS. 1–6, there is shown and described a navigational-based speed limit recording and monitoring system 9 designed to allow a driver 5 to selectively record posted speed limits 77 on roadways 85 and later use the system 9 to automatically inform the driver 5 when he or she exceeds the recorded speed limit 89 on a particular roadway 85. The system 9 includes a navigational system 11 located inside the motor vehicle 10. For illustration purposes the navigational system 11 is a GPS-based navigational system that includes a GPS receiver 13, disc player 22, and a display monitor 19. Loaded into the disc player 22 is one or more optical discs 15 containing a map database 24 that contains roadway information for a desired region. It should be understood that other types of wireless navigational systems 11 that provide location and route guidance information to drivers 5 of a motor vehicle 10 may be used. During use, the current location of the motor vehicle 10 is displayed on a map 80 (see FIG. 3) showing various roadways 85, 87 using the display monitor 19.

Coupled to the navigation system 11 is a means for associating a pre-existing or new "mark" location along a roadway with a numerical speed limit amount. In one embodiment, the means for inputting the "mark" locations is a "mark" button 16 mounted on or adjacent to the display monitor 19. Also mounted on or adjacent to the display monitor 19 is an "edit/delete" button 17 for editing or deleting a "mark" location and an input speed button 18 that activates the system 11 for receiving the inputted speed limit value from the numeric keys 20. During use, a speed limit 77 is manually inputted via one or more numeric keys 20 mounted on or adjacent to the display monitor 19. The inputted speed limit is then associated with the designated "mark" location on a roadway shown on the display monitor 19.

In another embodiment, the means for inputting a speed limit 77 is a link between the motor vehicle's analog or digital speedometer 30, 30', respectively, or other speed recording system that automatically transmits the motor vehicle's current speed 32, 32' to the navigation system 11 and associates it with the designated "mark" location. In still another embodiment, a combination button 40 located in a convenient location for the driver 5, such as on the steering wheel 50, is used to simultaneously "mark" a designated location and associate the motor vehicle's current speed 32 to the marked location. The combination button 40 may also be mounted with an ON/OFF button 42, a manual mark button 44, a delete/edit button 46 and a monitor button 48 discussed further below.

Later when traveling on the roadway, the navigation system 11 monitors the current location 90 of the motor vehicle 10 and displays the posted speed limit 77 associated with the most recently passed "mark" location on the display monitor 19. The driver 5 is able to easily determine the speed limit of the current roadway using the navigational system 11. The system 11 may also be coupled to the digital speedometer 30' to directly display the recorded speed limit 89 from the navigational system 11 on the speedometer 30'. The driver 5 would then be informed when the motor vehicle 10 has exceeded the posted speed limit 77 on the roadway without monitoring the navigational system 11. When the system 11 is used with an analog speedometer 30, an indicator light 57 may be mounted on the motor vehicle's dashboard which turns from "green" to "red" color to indicate when the motor vehicle 10 is traveling at or below the recorded speed limit 89 or has exceeded the recorded speed limit 89, respectively.

Navigation System

Figure 3:
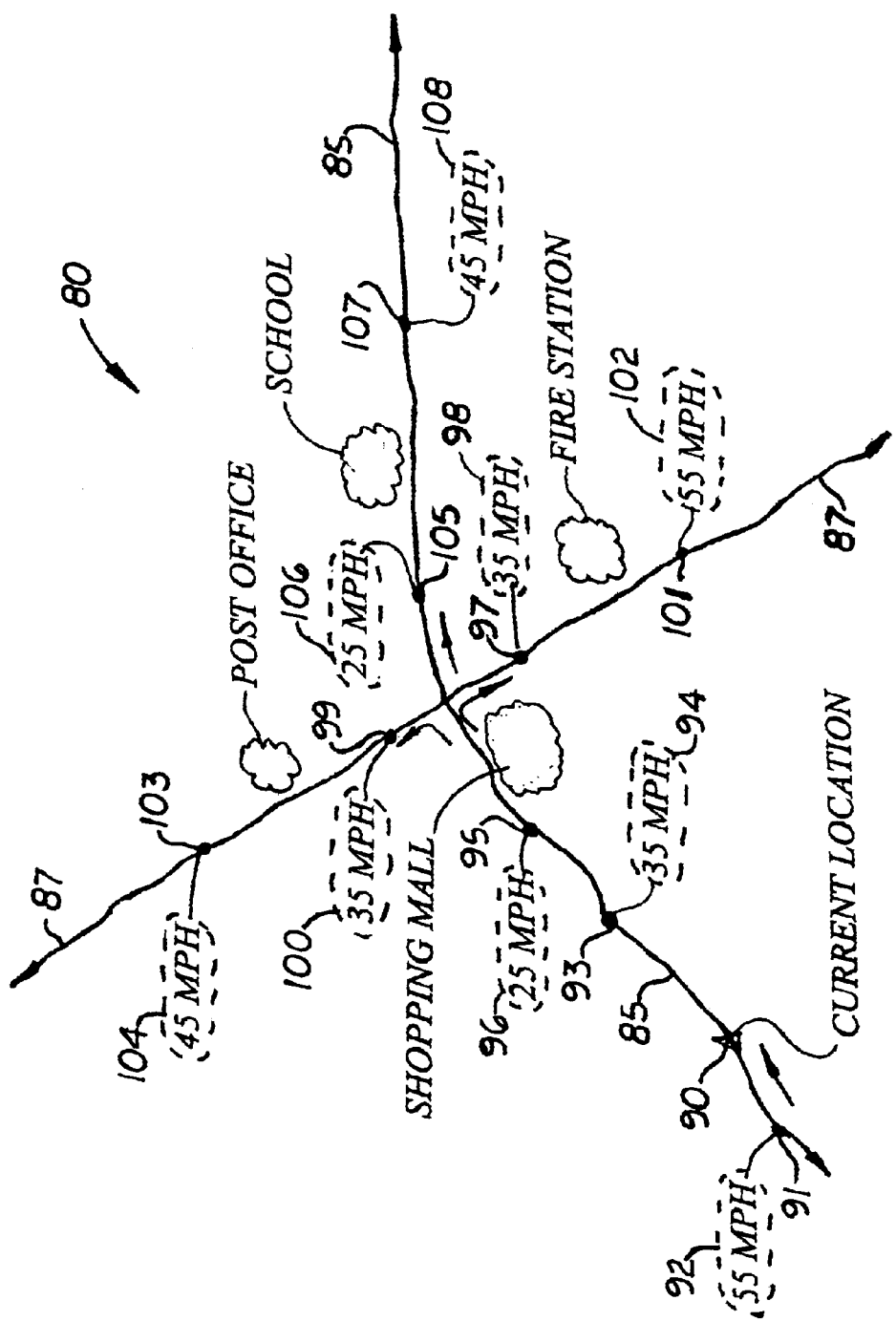
FIG. 3 is an illustration of the navigational system's monitor showing the map of the region with the current location of the motor vehicle and interconnecting roadways.

The navigational system 11 includes a GPS receiver 13 connected to a display monitor 19 that presents to the driver 5 a map 80 of a selected region 82 showing roadways 85, 87 and mark points 91, 93, 95, 97, 99, 101, 103, 105, 107 as shown in FIG. 3. The motor vehicle's current physical location 90 is indicated on the map 80 along with the location and names of the roadways and various points of interest.

The GPS receiver 13 is connected to an optical disc player 22 which contains a map database 24 and a GPS antenna 23 all mounted inside the motor vehicle 10. The GPS receiver 13 may include an audible voice feature that provides audible warnings or instructions to the driver 5 when the motor vehicle 10 has exceeded the recorded speed limit 89. The GPS receiver 13 includes various I/O ports that enable other peripheral devices, such as a speedometer 30, 30' and a wireless modem to transmit information to the GPS receiver 13. Such GPS receivers 13 are manufactured by Alpine Electronics of America, Inc, of Tokyo, Japan, and Pioneer North America, Inc. of Tokyo, Japan which connect to a DVD disc player 22.

Means for Entering "MARK" Points

Most GPS receivers 13 available today enable the users to select or "mark" way points or locations on a roadway using a "mark" button 16 on the GPS receiver 13. With these receivers 13, the "mark" location is temporarily stored in the memory until the "mark" location is deleted by the user. Most GPS receivers 13 also include an edit/delete button 17 that enables the user to manually edit or delete the "mark" locations.

In the system 11 described herein, loaded into the memory of the GPS receiver 13 is a software program 25 designed to store both the "mark" locations and the recorded speed limit 89 associated with each "mark" location. The software program 25 is then used to display "mark" locations and recorded speed limit 89 on the display monitor 19.

Means for Inputting the Posted Speed Limit

As mentioned above, coupled to the navigation system 11 is a means for inputting and associating the posted speed limit 77 with a "mark" location. In one embodiment shown in FIG. 2, the means for inputting the posted speed limit 77 is one or more numeric buttons 20 mounted on the frame of the GPS receiver 13 or "touch" screen buttons that enable the driver to manually input a posted speed limit 77 and associate it with a designated "mark" location on a roadway. When the posted speed limit 77 is inputted and associated with a "mark" location, it is automatically displayed on the display monitor 19 along with the map information.

Figure 2:
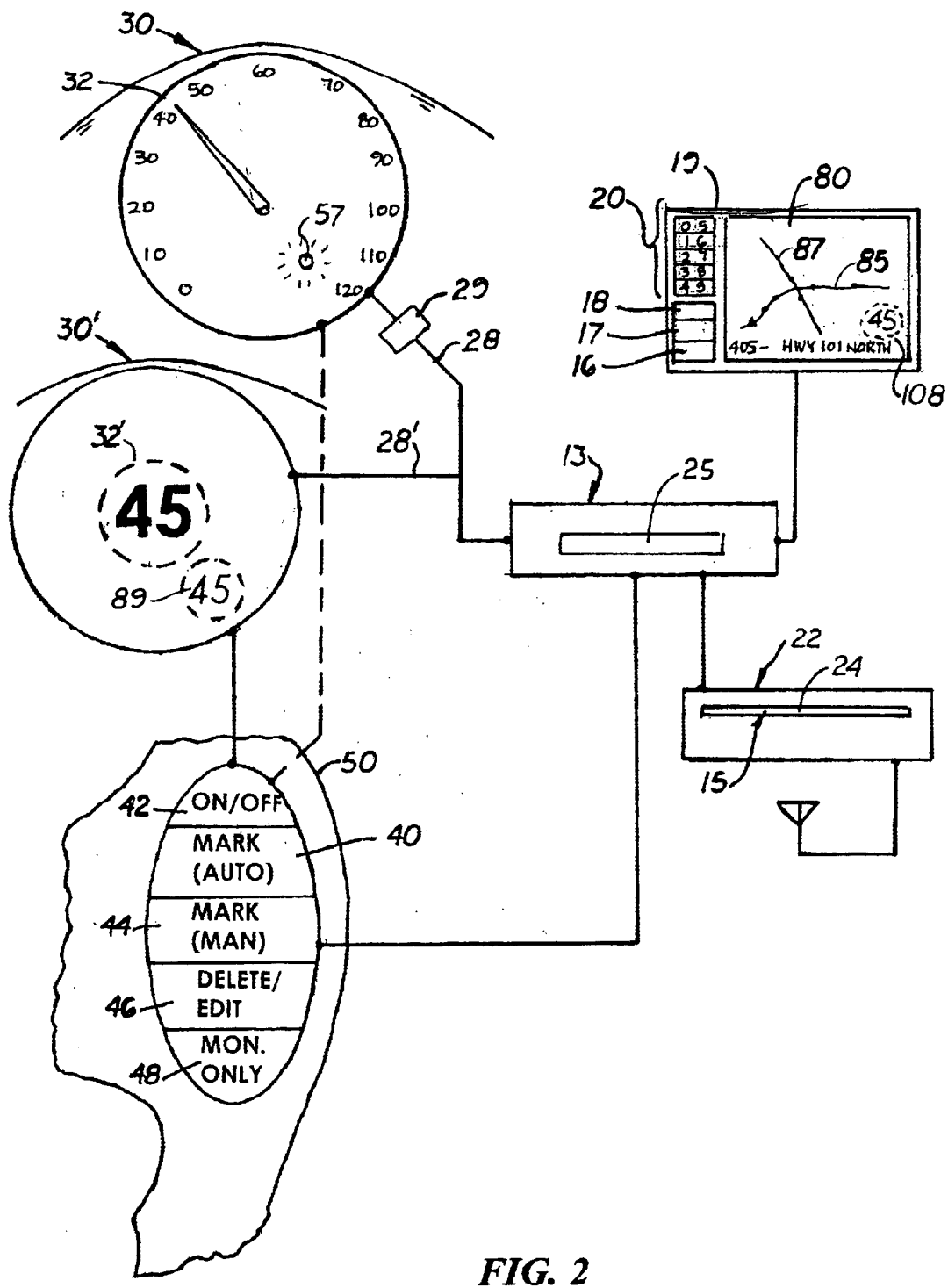
FIG. 2 is an illustration showing the connection of the components used in the system.

In a second embodiment, shown in FIG. 2, means for inputting the posted speed limit 77 is a link 28, 28' between the motor vehicle's analog 30 or digital speedometer 30' that automatically transmits the motor vehicle's current speed information 32, 32', respectively, to the navigational system 11.

There are two types of "mark" buttons 40, 44. The first "mark" button 40 automatically transmits the motor vehicle's current speed 32, 32' to the navigational system 11. The second "mark" button 44 is used in combination with the input button 20 that the driver 5 uses to manually input the speed limit 77. The second mark button 44 is typically used to manually input and associate a speed limit 77 to a "mark" location when the motor vehicle 10 is starting or traveling at a speed below the posted speed limit 77. Both the first and second "mark" buttons 40, 44 may be mounted on the steering wheel 50 so that the driver 5 does not have to take his or her hands and eyes off the steering wheel 50 or road. When the system 9 is used with an analog speedometer 30, a converter 29 must be used to convert the analog signal to a digital signal for use by the navigational system 11.

Figure 4:
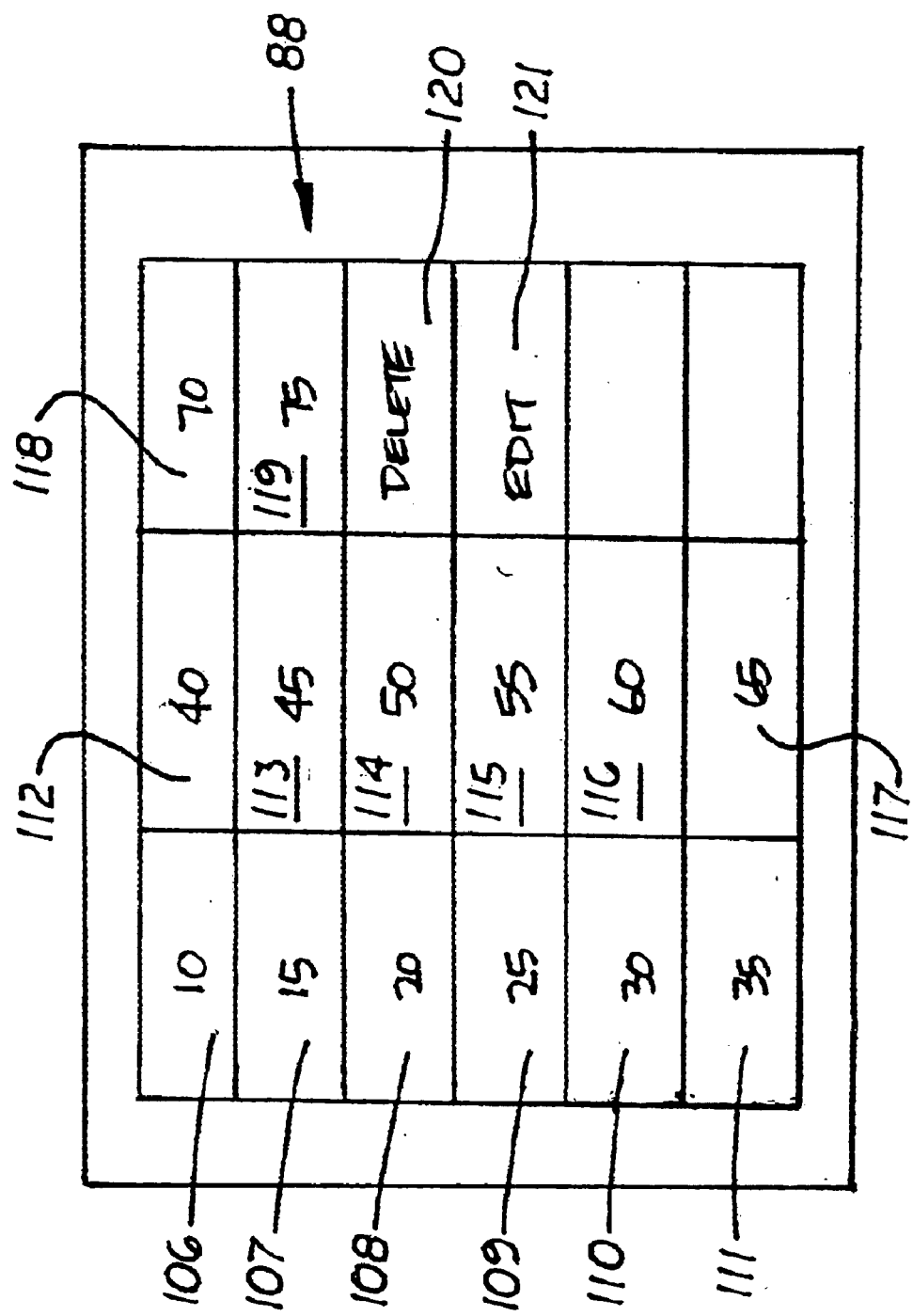
FIG. 4 is an illustration of the display monitor showing a group of speed limit input buttons.

When the input button 20 on the GPS receiver 13 is selected, a group 88 of buttons 106–119, each associated with a speed limit number from the following group (10, 15, 20, 25, 30, 35, 40, 45, 50, 55, 60, 65, 70, 75) is presented on the display monitor 19 as shown in FIG. 4. During use, the driver 5 selects the "mark" button and then one of the buttons 106–119 on the display monitor 19 to associate a speed limit 77 with the "mark" location. The display monitor 19 also includes a "delete" and "edit" button, 120, 121, respectively.

Presentation of Speed Limit Information

In the first embodiment, the speed limit information is displayed on the display monitor 19 along with roadway information, such as name of roadway, block address, and direction of travel. As mentioned above, the speedometer 30, 30' and GPS receiver 13 may be coupled together so that the recorded speed limit information 92 from the GPS receiver 13 is displayed on the motor vehicle's dashboard. In another embodiment, the recorded speed limit information 92 is displayed only on the display monitor 19. An LED light or similar signal could then be mounted on the dashboard which is activated by the GPS receiver 13 when the motor vehicle 10 exceeds the recorded speed limit 92. An alternative embodiment could include the use of a digital speedometer 30' in which the color of the motor vehicle's numeric speed is "green" when the motor vehicle 10 was at or below the recorded speed limit 89 and "red" when above the recorded speed limit 89.

Operation

The navigation system 11 is first activated so that the motor vehicle's current location 90 on a map 80 is displayed on a display monitor 19. The scale of the map 80 is adjusted to approximately to a 1/32 to 1/4 mile scale.

The "mark" locations and speed limit information 77 may be selected and inputted into the system 9 before driving or while driving. In each method, a "mark" location along a roadway is first selected and then a posted speed limit 77 is assigned and recorded to the "mark" location. The delete/edit button 46 is selected to change the recorded speed limit 89 or to delete the "mark" location altogether.

When a "mark" location and the speed limit information 77 are entered, the system 9 assumes that the recorded speed limit 89 continues indefinitely on the roadway or on connecting roadways until a new mark location or new speed limit 77 is entered. Since the posted speed limit 77 on a particular roadway may change often, use of the combination marking button 40 located on the steering wheel 50 which automatically inputs and associates the motor vehicle's current speed 32, 32' to the navigation system 11 may be preferred because it is easy to use and less distracting to the driver 5. The driver 5 is also able to easily monitor and adjust the exact location of the "mark" location by activating switches on the steering wheel 50.

FIG. 3 is an illustration of a display monitor 19 coupled to the navigational system 11 showing the current location 90 of a motor vehicle 10 traveling on a first roadway 85 that includes several "mark" locations 91, 93, 95, 105, and 107, each associated with a speed limit 92, 94, 96, 106, 108, respectively. Ahead of the motor vehicle 10 is an intersection which connects the first roadway 85 to a second roadway 87. Designated on the second roadway 87 is a plurality of "mark" locations 97, 99, 101, and 103, each with speed limits 98, 100, 102, 104, respectively, associated therewith. As the driver 5 travels on the first roadway 85, the current location 90 of the motor vehicle 10 is displayed on the map 80. When the motor vehicle 10 passes the second speed limit sign located at mark point 95, the driver activates the "mark" button 16, 40 or 44 and inputs the correct posted speed limit information (55 MPH) into the navigational system 11 using button 20 or 40. The navigational system 11 now displays the "mark" location's recorded speed limit information 89 on the map 80. When the motor vehicle 10 passes the third speed limit sign located at mark point 105 that changes the speed limit 77 on the roadway 85, the driver 5 again activates the "mark" button 16, 40 or 44 and inputs the new posted speed limit information (35 MPH) using buttons 20 or 40. The new "mark" location 95 and posted speed limit information 96 is then displayed on the map 80. As mentioned above, the system 9 assumes that the inputted speed limit information associated with the last "mark" location continues until the next "mark" point is passed. The activation and inputting of the mark point's speed limit information 77 is continued until the entire route is designated.

After all of the "mark" locations and the speed limit information have been entered for the entire route, the driver 5 is able to use the system 9 to monitor his or her speed limit along the route. Referring again to FIG. 3, as the driver 5 travels on the first roadway 85 the next day, the posted speed limit 92 (55 MPH) assigned to the first "mark" location 91 is displayed on the display monitor 19 or dashboard. As the driver 5 continues on the first roadway 85, the second and third "mark" locations 93, 95, respectively, are passed and their respective speed limits 35 MPH and 25 MPH are displayed on the display monitor 19 or on the dashboard. After driving through the intersection, the other "mark" locations 97, 99, 101, 103 are passed and the posted speed limit changes from 25 MPH to 35 MPH, 45 MPH, or 55 MPH depending on the roadway taken after the intersection.

Using the above system 9, a method of inputting posted speed limits is provided as delineated in FIG. 5, which includes the following steps:

a. selecting a navigation-based speed limit recording and warning system 9 located inside a motor vehicle 10, said system 9 including a GPS receiver 13, a display monitor 19, a map database 24, means for designating a "mark" location on a roadway, and means for inputting and associating speed limits with each said "mark" location;

b. activating said navigation system 9;

c. designating a "mark" location on a roadway located on said map database 24; and, d. associating a speed limit 77 with said "mark" location.

Also using the above system 9, a method of displaying posted speed limits 77 for roadways to a driver 5 is provided, as shown in FIG. 6, which includes the following steps:

a. selecting a navigation-based speed limit recording and warning system 9 located inside a motor vehicle 10, said system 9 including a GPS receiver 13, a visual display monitor 19, a map database 24, and means for selecting a mark location on a roadway presented on said visual display monitor 19; and means for inputting posted speed limits 77 into the GPS based navigational system 11;

b. activating said system 9;

c. selecting a "mark" location on a roadway on said map database 24 where the speed limit 77 is posted;

d. associating a speed limit number with each said "mark" location; and, e. driving on said roadway to receive the speed limit information 77 associated with each mark thereon.

In compliance with the statute, the invention described herein has been described in language more or less specific as to structural features. It should be understood, however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A speed limit recording system, comprising:

a. a motor vehicle including a steering wheel;

b. means for displaying the current speed of said motor vehicle to a driver of said motor vehicle; and, c. a navigational system associated with said motor vehicle, said navigational system including a display and a map database containing a plurality of roadways;

d. means for manually designating and recording a mark location on a roadway in said map database; and, e. at least one input key coupled to said navigational system used to associate a speed limit with said mark location.

2. The speed limit recording system, as recorded in claim 1, wherein said means for displaying the current speed of said motor vehicle is a speedometer.

3. The speed limit recording system, as recorded in claim 1, wherein said means for displaying the current speed of said motor vehicle is said display on said navigational system.

4. The speed limit recording system, as recorded in claim 1, further including a plurality of speed limit input keys used to associate different speed limits with said mark location.

5. The speed limit recording system, as recited in claim 1, wherein said means for associating said speed limit is a combination input key used to designate and record a mark location mark on a roadway and simultaneously record the current speed limit of said motor vehicle thereto.

6. The speed limit recording system, as recited in claim 1, wherein said navigational system is a GPS-based navigational system.

7. The speed limit recording system, as recited in claim 1, wherein said means for manually designating and recording a mark location is a mark input key located on said steering wheel in said motor vehicle.

8. The speed limit recording system, as recited in claim 5, wherein said combination input key is located on said steering wheel in said motor vehicle.

9. A motor vehicle speed limit recording system, comprising:

a. a navigational system located inside a motor vehicle and capable of presenting a map with a plurality of roadways displayed thereon;

b. means for a driver to manually designating and recording on said navigational system a mark location on said roadway; and, c. means for assigning a speed limit to each said mark location; and, d. a speedometer display located inside said motor vehicle and used to display the current speed of the motor vehicle, said speedometer display being coupled to said navigational system and includes means for informing a driver when the motor vehicle travels passed said mark location designated by a driver and the speed of the motor vehicle exceeds the speed limit assigned to said mark location.

10. The speed limit recording system as recited in claim 9, wherein said means for assigning a speed limit to said mark location is an input button used to assign the current speed of the motor vehicle to said mark location.

11. The speed limit recording system, as recited in claim 9, further including a warning displayed on said speedometer display that indicates when the current speed of the motor vehicle exceeds the speed limit assigned to said mark location.

12. A motor vehicle speed limit recording system, comprising:

a. a navigational system located inside a motor vehicle and capable of presenting a map with a plurality of roadways displayed thereon;

b. means for manually designating and recording a mark location on said roadway; and, c. means for assigning a speed limit to each said mark location comprising a plurality of speed limit input keys connected to said navigational system.

13. The speed limit recording system as recited in claim 12, further including means for displaying the current speed of said motor vehicle.

14. A motor vehicle speed limit recording system, comprising:

a. a navigational system capable of presenting a map with a plurality of roadways displayed thereon;

b. means for manually designating and recording a mark location on said roadway;

c. means for imputing a speed limit to each said mark location, said means for inputting the speed limit into said navigational system is a combination mark and speed input key used to designate said mark location and to record the current speed limit of said motor vehicle; and d means for displaying the current speed of said motor vehicle.

15. A motor vehicle speed limit recording system, comprising:

a. a navigational system capable of presenting a map with a plurality of roadways displayed thereon;

b. a mark button coupled to said navigational system used to manually designate and record a mark location on a roadway in a map presented on said navigational system;

c. means for imputing a speed limit to each said mark location; and, d means for displaying the current speed of said motor vehicle.

16. The speed limit recording system, as recited in claim 15, wherein said mark button is located on the steering wheel in said motor vehicle.

17. A motor vehicle speed limit recording system, comprising:

a. a navigational system capable of presenting a map with a plurality of roadways displayed thereon;

b. means for manually designating and recording a mark location on said roadway;

c. means for imputing a speed limit to a said mark location including, an input key assigned to one speed limit value of the following groups of speed limit values: 10, 15, 20, 25, 30, 35, 40, 45, 50, 55, 60, 65, 70, 75; and, d means for displaying the current speed of said motor vehicle.

* * * * *